United States Patent
Brandt et al.

(10) Patent No.: US 9,003,375 B2
(45) Date of Patent: Apr. 7, 2015

(54) OPTIONAL LOGGING OF DEBUG ACTIVITIES IN A REAL TIME INSTRUCTION TRACING LOG

(75) Inventors: Jason W. Brandt, Austin, TX (US); Peter Lachner, Heroldstatt (DE); Huy V. Nguyen, Round Rock, TX (US); Jonathan J. Tyler, Austin, TX (US)

(73) Assignee: Intel Corporation, Santa Clara, CA (US)

(*) Notice: Subject to any disclaimer, the term of this patent is extended or adjusted under 35 U.S.C. 154(b) by 127 days.

(21) Appl. No.: 13/993,477

(22) PCT Filed: Dec. 30, 2011

(86) PCT No.: PCT/US2011/068210
§ 371 (c)(1),
(2), (4) Date: Jun. 12, 2013

(87) PCT Pub. No.: WO2013/101214
PCT Pub. Date: Jul. 4, 2013

(65) Prior Publication Data
US 2013/0263093 A1    Oct. 3, 2013

(51) Int. Cl.
*G06F 11/36* (2006.01)
*G06F 9/44* (2006.01)
*G06F 11/34* (2006.01)
(Continued)

(52) U.S. Cl.
CPC .............. *G06F 11/3466* (2013.01); *G06F 9/06* (2013.01); *G06F 9/30* (2013.01); *G06F 11/34* (2013.01); *G06F 11/3495* (2013.01);
(Continued)

(58) Field of Classification Search
CPC .................................................... G06F 11/3636
USPC ........................................................... 717/128
See application file for complete search history.

(56) References Cited

U.S. PATENT DOCUMENTS

| | | | |
|---|---|---|---|
| 2003/0088854 A1* | 5/2003 | Wygodny et al. | 717/130 |
| 2004/0030962 A1* | 2/2004 | Swaine et al. | 714/45 |

(Continued)

OTHER PUBLICATIONS

Liu et al., "On Signal Tracing for Debugging Speedpath-Related Electrical Errors in Post-Silicon Validation", in 19$^{th}$ IEEE Asian Test Symposium, pp. 243-248, 2010.*

(Continued)

*Primary Examiner* — Wei Zhen
*Assistant Examiner* — Timothy Duncan
(74) *Attorney, Agent, or Firm* — Blakely, Sokoloff, Taylor & Zafman LLP

(57) ABSTRACT

In accordance with embodiments disclosed herein, there are provided methods, systems, mechanisms, techniques, and apparatuses for implementing optional logging of debug activities in a real time instruction tracing log. For example, in one embodiment, such means may include an integrated circuit having means for initiating instruction tracing for instructions of a traced application, mode, or code region, as the instructions are executed by the integrated circuit; means for generating a plurality of packets to a debug log describing the instruction tracing; means for initiating an alternative mode of execution within the integrated circuit; and means for suppressing indication of entering the alternative mode of execution. Additional and alternative means may be implemented for selectively causing an integrated circuit to operate in accordance with an invisible trace mode or a visible trace mode upon transition to the alternative mode of execution.

28 Claims, 14 Drawing Sheets

(51) Int. Cl.
*G06F 9/06* (2006.01)
*G06F 9/30* (2006.01)

(52) U.S. Cl.
CPC .......... *G06F 11/3476* (2013.01); *G06F 11/36* (2013.01); *G06F 2201/805* (2013.01); *G06F 11/3636* (2013.01)

(56) References Cited

U.S. PATENT DOCUMENTS

| | | |
|---|---|---|
| 2006/0015853 A1 | 1/2006 | Babineau et al. |
| 2006/0026582 A1 | 2/2006 | Collard et al. |
| 2008/0235538 A1* | 9/2008 | Horley et al. ............... 714/47 |
| 2009/0313507 A1* | 12/2009 | Swaine et al. ............... 714/38 |
| 2010/0083052 A1 | 4/2010 | Huber et al. |
| 2011/0289485 A1 | 11/2011 | Mejdrich et al. |
| 2011/0314342 A1* | 12/2011 | Gilkerson et al. ........... 714/45 |
| 2012/0030521 A1* | 2/2012 | Aranguren et al. ......... 714/45 |

OTHER PUBLICATIONS

Litt, "Support for Debugging in the Alpha 21364 Microprocessor", Proceedings of IEEE International Test Conference, pp. 584-589, 2002.*

Rotenberg et al., "Trace Processors", Proceedings of Thirtieth Annual IEEE/ACM International Symposium on Microarchitecture, pp. 138-149, 1997.*

PCT International Search Report for PCT Counterpart Application No. PCT/US2011/068210, 3 pgs., (Jun. 21, 2012).

PCT Written Opinion of the International Searching Authority for PCT Counterpart Application No. PCT/US2011/068210, 5 pgs., (Jun. 21, 2012).

PCT Notification concerning Transmittal of International Preliminary Report on Patentability (Chapter I of the Patent Cooperation Treaty) for PCT Counterpart Application No. PCT/US2011/068210, 7 pgs., (Jul. 10, 2014).

* cited by examiner

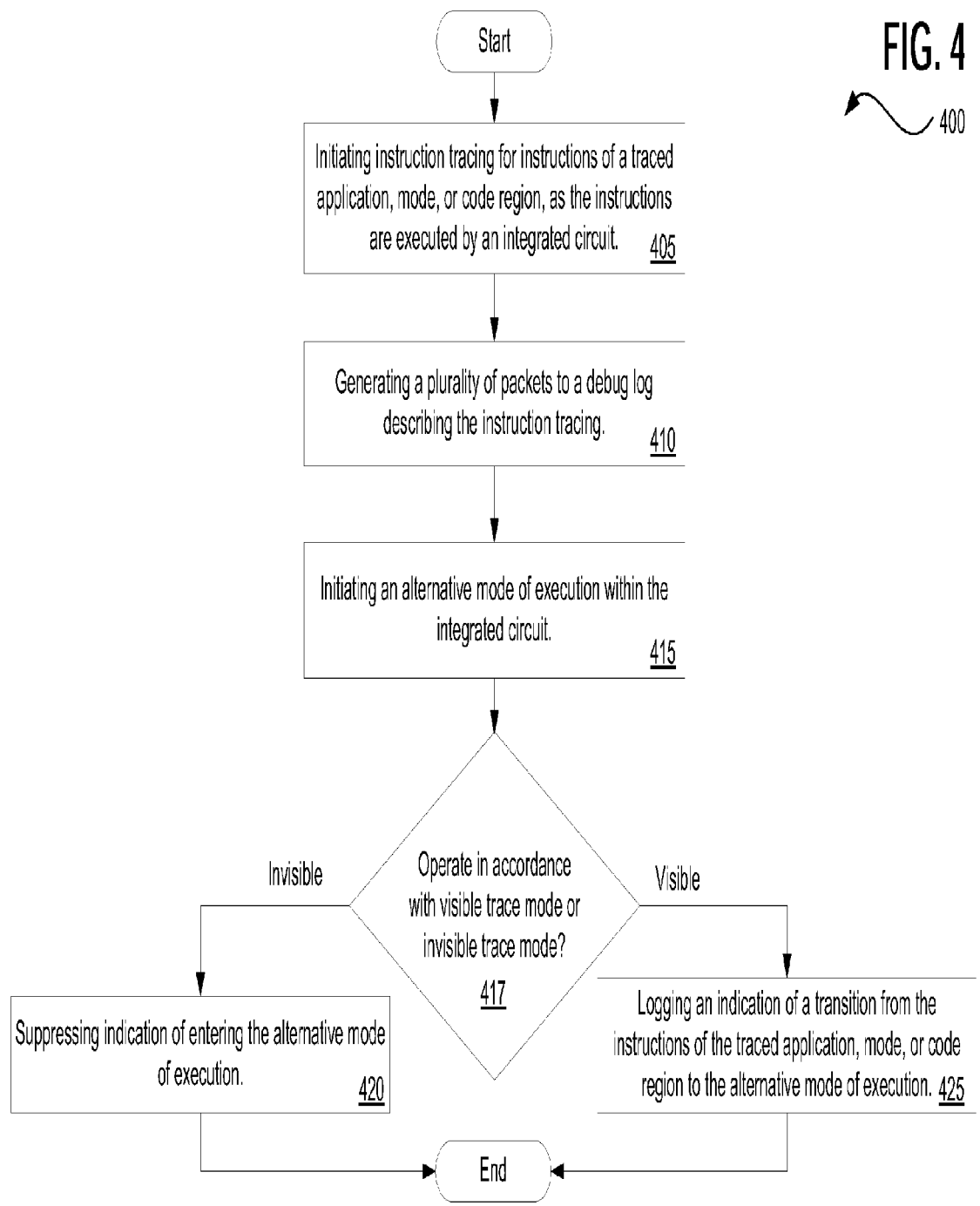

US 9,003,375 B2

OPTIONAL LOGGING OF DEBUG ACTIVITIES IN A REAL TIME INSTRUCTION TRACING LOG

CROSS-REFERENCE TO RELATED APPLICATION

This patent application is a U.S. National Phase Application under 35 U.S.C. §371 of International Application No. PCT/US2011/068210, filed Dec. 30, 2011, entitled OPTIONAL LOGGING OF DEBUG ACTIVITIES IN A REAL TIME INSTRUCTION TRACING LOG.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to systems and methods for implementing optional logging of debug activities in a real time instruction tracing log.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Real Time Instruction Tracing (RTIT) is a debug feature that logs what instructions are being executed by a processor. RTIT logs when starting or stopping tracing due to the processor entering or leaving a traced region or mode. Logging the starting and stopping of tracing provides a variety of benefits including, for example, properly counting the number of cycles expended in the traced region or mode, which in turn enables the Instructions Per Cycle (IPC) to be calculated. Probe mode is a debug feature that involves executing extra instructions that are not part of the normal software. When an RTIT trace is being created, the debugger may enter probe mode in order to assist in the debugging by providing additional logging information or by modifying behavior of the processor or a system configured with such a processor. In some circumstances, it may be beneficial to have the RTIT log indicate where and/or when probe mode was entered and exited. This can provide extra information to the log; allowing the impact of the debug mode on the RTIT trace to be seen. In other circumstances, it may be beneficial to have the RTIT log ignore not only all instructions executed in probe mode, but to also ignore that probe mode was entered at all. By allowing the RTIT log to be unperturbed by entering probe mode, it is possible to use probe mode to debug a system without interfering with the RTIT trace. An example of when this is useful is when a hardware debugger is trying to debug the RTIT tracing mechanism itself. Conventional RTIT mechanisms provide no means by which debug techniques that cause extra instructions to be executed can still provide transparent debugging of the RTIT mechanism itself.

The present state of the art may therefore benefit from systems and methods for implementing optional logging of debug activities in a Real Time Instruction Tracing (RTIT) log as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 4 is a flow diagram illustrating a method for implementing optional logging of debug activities in a real time instruction tracing log in accordance with described embodiments;

DETAILED DESCRIPTION

Figure 1:
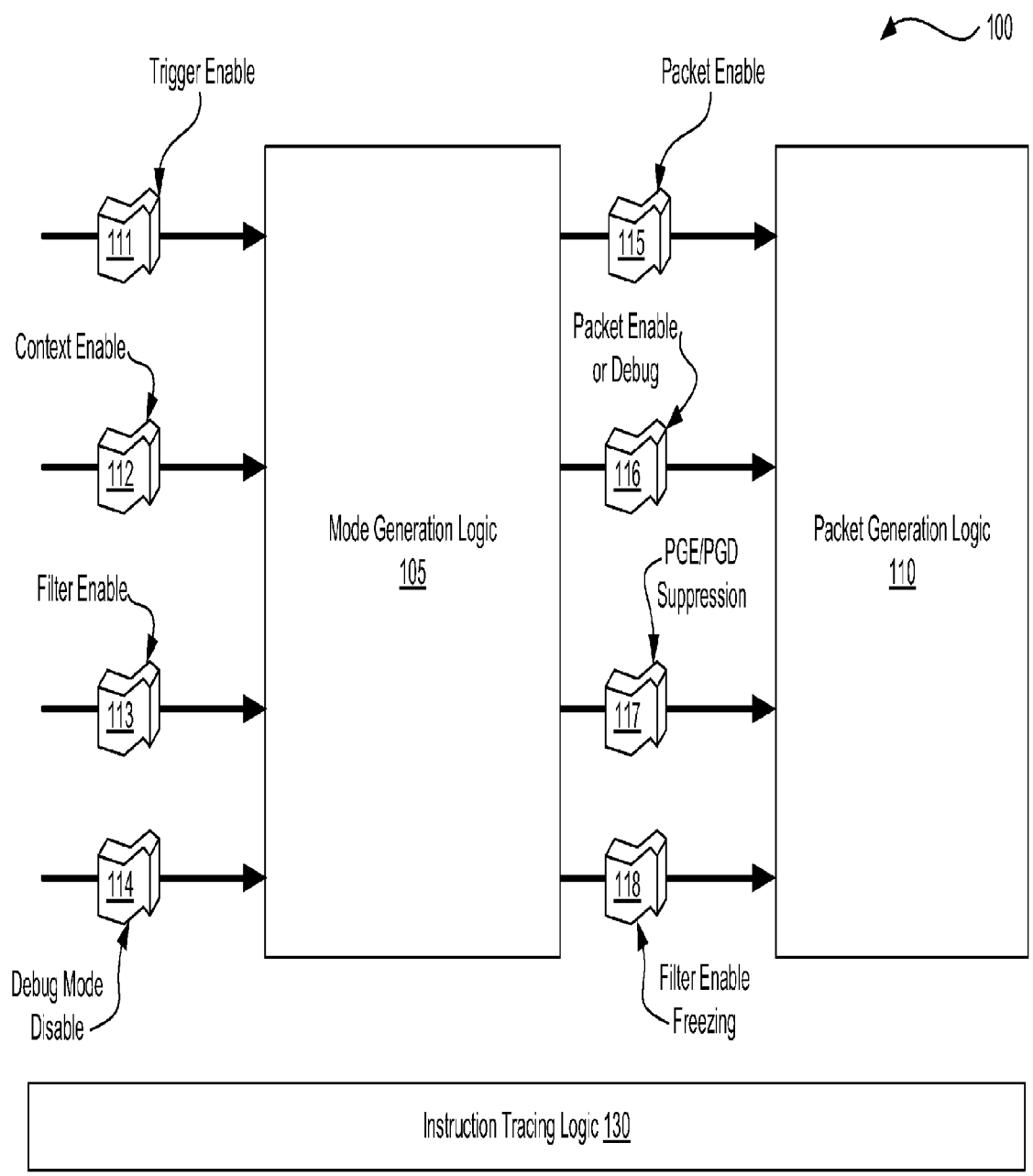
FIG. 1 illustrates an exemplary architecture in accordance with which embodiments may operate.

Described herein are systems and methods for implementing optional logging of debug activities in a real time instruction tracing log. For example, in one embodiment, such means may include an integrated circuit having means for initiating instruction tracing for instructions of a traced application, mode, or code region, as the instructions are executed by the integrated circuit; means for generating a plurality of packets to a debug log describing the instruction tracing; means for initiating an alternative mode of execution within the integrated circuit; and means for suppressing indication of entering the alternative mode of execution. Additional and alternative means may be implemented for selectively causing an integrated circuit to operate in accordance with an invisible trace mode or a visible trace mode upon transition to the alternative mode of execution.

As execution proceeds through the instructions being executed certain events of interest may be configured to trigger the generation of packets through the use of RTIT logic to report additional information about the event. For example, an event such as a conditional jump, a page fault, and so forth may be programmatically configured to generate a packet which says, execution was at location "x" when event "y" occurred, and the jump or fault proceeded to location "z." Sometimes the packet may also contain a subset of this information. For example the packet may only indicate "next conditional jump was taken" which may be used to determine that the jump proceeded to location "z." Additional information may be reported for the event such as when an event occurred in terms of cycle time, wall clock time, and so forth. Maintenance packets having synchronization data may additionally be generated, as well as packets indicating what particular application or entity is running or triggering the designated event (e.g., such as a word processor, a browser, a hypervisor, etc.).

Although conventional logging technology exists, such technology is slow and burdens the processor with additional overhead processing required to generate the necessary instructions for the logging capability above and beyond normal processing. Moreover, conventional techniques provide no mechanism by which instructions that are not associated with the software being monitored (e.g., instructions executed on behalf of a debug mode) can themselves be programmatically made invisible or visible to the logging functionality. This is because trace capabilities operate not only upon an application, region, or mode being traced, but additionally operate upon and thus "see" or make visible debug instructions and other non-software-visible instructions.

It is desirable in certain situations to make debug operations invisible such that the processor behaves from a logging perspective as though extra instructions were not being inserted into the execution stream. Accordingly, the techniques for implementing optional logging of debug activities in a real time instruction tracing log as are described herein provide capability to enable and disable visibility of instructions or modes that should not be traced in a trace log. Such capability makes it possible to correlate the trace with the debug and determine, for example, where a trace entered into a particular application or code region as well as correctly determine Instructions Per Cycle (IPC) for such an application or code region as though the extra debug instructions were not executed and did not consume a portion of the processing capability of the processor, as such overhead consumption for the debug instructions may improperly skew the results of an IPC calculation. For example the optional debug logging capability makes it possible to determine that debug instructions were executed between time "x" and y" causing a slow down in processing that can be correlated to the trace operation as opposed to a problem with an application being analyzed.

Although it is more intuitive to simply indicate whenever the tracing region or mode is entered/exited due to a non-tracing mode (such as a debug mode), such schemes make it difficult to verify the core tracing functionality. Thus, while analysis may be expected for only a particular application, those conventional debug techniques which inject additional instructions may cause different behavior yielding incorrect or inconsistent results in comparison to a non-debug operation of the same application.

Accordingly, the optional logging of debug activities in a Real Time Instruction Tracing (RTIT) log as described herein provides a mechanism to make a debug mode invisible through the creation of a new mode of operation, specifically, a selectable invisible-mode of operation. The invisible-mode mode of operation can be configured programmatically such that debug operations can be provided at selected times (e.g., thus operating in accordance with a visible mode), but at other times when it is not desirable to have them, all the activities of the debug can be completely hidden such that it appears as though the debug methodology was not being used at all. The selectability of invisible mode and visible mode is not limited to only debug modes and debug related instructions, but may be applied to any alternative mode of operation, such as a transition from a designated application, code region, or mode to any of several alternative modes of execution including, for example, execution of hypervisor related instructions, execution of firmware instructions, execution of Operating System instructions, etc.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled with a computer system bus. The term "coupled" may refer to two or more elements which are in direct contact (physically, electrically, magnetically, optically, etc.) or to two or more elements that are not in direct contact with each other, but still cooperate and/or interact with each other.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 illustrates an exemplary architecture 100 in accordance with which embodiments may operate. In particular, mode generation logic 105, packet generation logic 110, and Real Time Instruction Tracing (RTIT) logic 130 are depicted. Each of elements 105, 110, and 130 may alternatively be referred to as logic modules.

Various enables and disables are evaluated by the mode generation logic 105 and the packet generation logic 110 which in turn causes or establishes a set of actions. For example, depending on the combination of enables and disables, various actions will follow according to the evaluation.

Trigger enable 111 indicates whether or not the RTIT logic 130 is active. For example, trigger enable 111 being true (e.g., TriggerEn being set to "1") may indicate that RTIT is overall enabled due to the RTIT enable bits in an MSR (Model specific register) being set.

Context enable 112 indicates whether an appropriate application, code region, or mode is contextually appropriate such that RTIT is applicable. For example, if watching a designated application then the designated application is contextually relevant because, for example, instructions associated with such a designated application are being executed. If watching an operating system (OS) then instruction execution is within code associated with the OS, and thus, contextually relevant. If a hypervisor is not designated as an application or code region to be watched, then context enable 112 would indicate code being executed in association with such a hypervisor is not contextually relevant, and so forth. Thus, if Context enable 112 for RTIT tracing is programmed to watch only privilege level 3 (e.g., applications) then Context enable 112 is false (e.g., ContextEn is "0") when the processor is not at privilege level 3.

Filter enable 113 indicates that code execution falls within a specified address range. For example, filter enable 113 permits filtering for certain addresses within a range and thus, when filter enable 113 is true, code execution is within a linear address range specified or within one of multiple ranges specified. Filter enable 113 may therefore be used to indicate that trace packets may be desired when instructions are executed within a specified range, but not outside of the specified range. Thus, if filter enable 113 has a programmed filter range as between 0x5000 and 0x5500 then filter enable 113 is true (e.g., FilterEn is set to "1") if execution jumps from 0x4000 to 0x5200 resulting in execution within the specified range. Alternatively, Filter enable 113 may be used to indicate that code execution falls outside of a specified address range or ranges, and trace packets are therefore desired for code outside of the designated addresses.

Debug mode disable 114 indicates that an invisible-trace mode is initiated which in turn is used to cause the suppression certain information, such as transition events into and out of an alternative mode of execution. Additionally, debug mode disable 114 may be used to ensure that the trace provides no indication that the processor ever left RTIT tracing mode of a given application, code region, or mode for an alternative mode of execution, be it a debug mode or otherwise. As is described below, time-base counters may continue to run and packets may be generated due to those time-based counters.

Each of trigger enable 111, context enable 112, filter enable 113, and debug mode disable 114 are inputs to mode generation logic 105 which sets a mode based on the enables and disables. From the mode generation logic 105, packet generation logic 110 is provided a series of inputs including packet enable 115, packet enable or debug 116, PGE/PGD suppression 117, and filter enable freezing 118.

Packet enable 115 is passed by mode generation logic 105 when debug mode disable is set to zero or false, and when trigger enable 111 is true and context enable 112 is true and filter enable 113 is true.

Packet enable 115 will go to zero or false upon entry into a probe mode or other mode that executes extra instructions for debug or other usages, thus preventing packet generation logic 110 from generating certain packets, such as tracing packets describing various execution events. Conversely, packet enable or debug 116 is not forced to zero or false when entering into in a probe mode or debug mode. When visible mode is desired, the RTIT log should indicate that an alternative mode has been entered, and thus, ContextEn should be forced to 0, but does not need to force DebugModeDis to 1, which will in turn cause both Packet Enable 115 and PacketEnableOrDebug 116 to go to 0. When invisible mode is desired, the RTIT log should not show that an alternative mode has been entered, and thus, entry into the alternative mode should force DebugModeDis to 1 but does not need to force ContextEn to 0, which in turn will force PacketEnable to 0, but PacketEnableOrDebug will be unchanged (e.g., PacketEnableOrDebug would stay at 1 if the CPU had it previously as 1).

Packet Generation Enable (PGE) and Packet Generation Disable (PGD) are packets that are generated when the RTIT region or mode is entered and exited respectively. PGE/PGD suppression 117 indicates that the processor is in an invisible debug mode and thus PGE and PGD packets should not be generated to avoid potentially causing confusion for packet handlers receiving packets generated pursuant to Real Time Instruction Tracing. For example, events occurring in the invisible debug mode may cause a PGE or PGD packet generated in that mode to have an incorrect address. The PGE/PGD suppression 117 may therefore be utilized to delay or wait until an exit is reached at which point the correct address may be determined and passed with a generated packet.

Filter enable freezing 118 causes filter enable 113 to remain unchanged when debug mode disable 114 is set to true.

Through evaluation of the above elements, an alternative mode of execution such as debug mode which injects instructions into the execution flow may be permitted to proceed without interference. Certain packets may be suppressed to enable an invisible mode which hides the logging of events associated with the alternative mode of execution but without altering the execution of instructions associated with an application, code region, or mode subject to Real Time Instruction Tracing logic 130.

Figure 2:
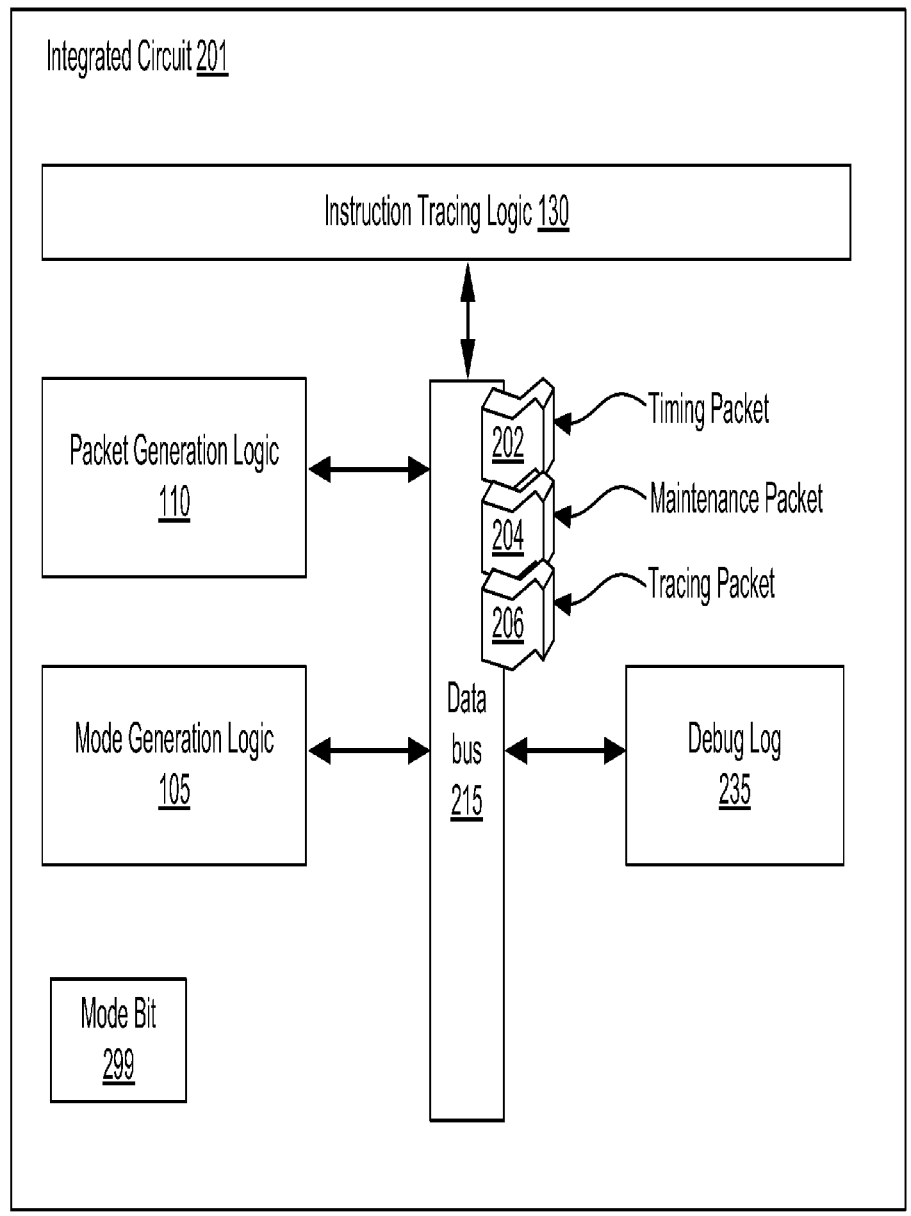
FIG. 2 illustrates an alternative exemplary architecture in accordance with which embodiments may operate.

FIG. 2 illustrates another alternative exemplary architecture 200 in accordance with which embodiments may operate. For example, an integrated circuit 201 is depicted as having a data bus 215 interconnecting instruction tracing logic 130 to trace instructions of a traced application, mode, or code region, as the instructions are executed by the integrated circuit with packet generation logic 110 to generate a plurality of packets to a debug log 235 describing the traced instructions. In such an embodiment, the integrated circuit initiates an alternative mode of execution and mode generation logic 105 of the integrated circuit suppresses indication of entering the alternative mode of execution.

In one embodiment, the integrated circuit further includes a mode bit 299. The mode bit 299 may be utilized by the integrated circuit 201 to determine whether to operate in accordance with an invisible trace mode or a visible trace mode. For example, in one embodiment, the packet generation logic 110 and the mode generation logic 105 operate in accordance with either the invisible trace mode or the visible trace mode based on the mode bit 299.

In one embodiment, the integrated circuit 201 initiates instruction tracing for instructions of a traced application, mode, or code region via the instruction tracing logic 130. In such an embodiment, the integrated circuit 201 further initiates the alternative mode of execution which may be, for example, the integrated circuit entering a debug mode or other types of alternative execution such as entering processing of an Operating System or entering execution for a hypervisor. In such embodiments, the alternative mode of execution is associated with an execution flow which is distinct from the application, code region, or mode of execution subject to the instruction trace.

In one embodiment, the mode generation logic suppresses indication of entering the alternative mode of execution by suppressing packets associated with the instruction tracing during the alternative mode of execution. For example, when operating in accordance with an invisible trace mode, such packets (e.g., tracing packets 206) may be suppressed.

In one embodiment, processing on the integrated circuit 201 further includes (a) returning from the alternative mode of execution; (b) suppressing indication of returning from the alternative mode of execution; and (c) generating additional packets to the debug log 235 describing the instruction tracing for the instructions of the traced application, mode, or code region, as the instructions are executed by the integrated circuit 201 subsequent to returning from the alternative mode of execution. For example, if operating in accordance with invisible trace mode for the alternative mode of execution, then the transition event from the application, code region, or mode subject to the instruction trace will be suppressed, but then, normal instruction tracing may be resumed, including the generation and reporting of packets describing the instruction tracing.

In one embodiment, the packet generation logic 110 generates the plurality of packets to the debug log 235 describing the instruction tracing by generating tracing packets 206 associated with the instructions of the traced application, mode, or code region. In one embodiment, the tracing packets 206 indicate execution events associated with the instructions executed by the integrated circuit 201 of the traced application, mode, or code region.

In one embodiment, the tracing packets 206 indicate execution events and the mode generation logic 105 suppresses indication of entering the alternative mode of execution by suppressing tracing packets 206 indicating an execution event to an alternative application, mode, or code region not subject to the instruction tracing. For example, such an execution event may be selected from the group including: (a) an instruction branch; (b) an interrupt; (c) an exception; (d) a doorbell; and (e) a trap.

In one embodiment, the mode generation logic 105 suppresses the indication of entering the alternative mode of execution by suppressing a Packet Generation Disable (PGD) packet indicating a transition either from the instructions of the traced application, mode, or code region or to an alternative mode of execution. The inverse may also occur for return of execution from the alternative mode. For example, processing on the integrated circuit 201 may further include the mode generation logic 105 suppressing a Packet Generation Enable (PGE) packet indicating either a transition from the alternative mode of execution or to the instructions of the traced application, mode, or code region.

In one embodiment, the packet generation logic 110 generates the plurality of packets to the debug log 235 describing the instruction tracing by generating packets having timing information associated with the instructions of the traced application, mode, or code region. Such packets may be timing packets 202 or other packets which indicate appropriate time-based information, whether such information is clock specific to the integrated circuit or related to "wall clock" information, or other types of time based data such as frequency of the integrated circuit, ratio information, or reporting of various timing related counters.

In one embodiment, the packets having timing information indicate counter and/or clock information associated with the instructions executed by the integrated circuit 201 of the traced application, mode, or code region. In one embodiment, the mode generation logic 105 suppresses indication of entering the alternative mode of execution by (a) incrementing time-based counters during the alternative mode of execution, in which the time-based counters generate the packets having the timing information. In one embodiment, the execution time during the alternative mode of execution is attributed, from the perspective of the timing related packets, to either no instruction or attributed to an instruction subject to the instruction tracing prior to initiating the alternative mode of execution or subsequent to the return from the alternative mode of execution. Stated differently, the execution time consumed by instructions or operations during the alternative mode of execution is masked or hidden in such a way that an instruction associated with the initial mode of execution appears as though it took a longer than normal time to execute. This longer than normal time of execution would thus be the sum of the actual execution time for the instruction associated with the initial mode of execution (e.g., an instruction of the application, code region, or mode subject to the instruction tracing) plus the time consumed by one or more instructions or operations executed by the integrated circuit during the alternative mode of execution.

Time-based counters may continue to count and increment despite the integrated circuit no longer operating upon the instructions subject to the instruction trace, in which the integrated circuit is instead operating on instructions or operations which constitute the alternative mode of execution (e.g., debug instructions, etc.). Suppressing indication of alternative mode may hide the transition to and from the alternative mode of execution, but so as to account for the time spent in the alternative mode of execution, the debug log 235 will reflect that the integrated circuit got stuck, or took an unusually long time to execute whatever instruction was the next instruction to execute subject to the instruction tracing.

In one embodiment, the packet generation logic 110 generates the plurality of packets to a debug log 235 describing the instruction tracing by (a) generating tracing packets 206; (b) generating timing packets 202; and (c) generating maintenance packets 204 in support of the instruction tracing.

In one embodiment, the integrated circuit 201 is, includes, constitutes, or implements a Central Processing Unit (CPU). Such a central processing unit may be utilized for one of a tablet computing device or a smartphone.

In one embodiment, initiating the instruction tracing constitutes initiating Real Time Instruction Tracing (RTIT) for the instructions of the traced application, mode, or code region, as the instructions are executed by the integrated circuit 201.

As noted above, in accordance with some of the described embodiments, the integrated circuit may further include a mode bit 299 which is utilized to make determinations between operating in accordance with a visible trace mode or an invisible trace mode. Thus, in accordance with one embodiment, the integrated circuit 201 initiates instruction tracing for instructions of a traced application, mode, or code region, as the instructions are executed by the integrated circuit 201; generates a plurality of packets to a debug log 235 describing the instruction tracing; initiates an alternative mode of execution within the integrated circuit 201; and operates in accordance with an invisible-trace mode or a visible trace mode based on a mode bit 299 of the integrated circuit 201. Operating in accordance with the invisible-trace mode includes suppressing indication of entering the alternative mode of execution as described in detail above. Conversely, operating in accordance with the visible-trace mode includes logging an indication of a transition from the instructions of the traced application, mode, or code region to the alternative mode of execution.

In one embodiment, operating in accordance with the visible-trace mode further includes: the packet generation logic 110 generating packets indicating the transition from the instructions of the traced application, mode, or code region to the alternative mode of execution; and logging the packets indicating the transition with the debug log 235.

In one embodiment, the integrated circuit 201 operates in accordance with the visible trace mode by suspending counters and/or clocks associated with the instructions of the traced application, mode, or code region during the alternative mode of execution. Processing of the integrated circuit 201 may further include generating, via time-based counters, packets having timing information therein in which execution time during the alternative mode of execution is attributed to the alternative mode of execution and is distinguishable from execution time for the instructions of the traced application, mode, or code region. Thus, where the transition to the alternative mode is indicated, time spent on operations and instructions for the alternative mode of execution are correctly identifiable (e.g., not hidden) as being associated with instructions within the alternative mode and are not attributed back to one or more instructions subject to the instruction trace as may occur in accordance with the invisible trace mode.

Figure 3:
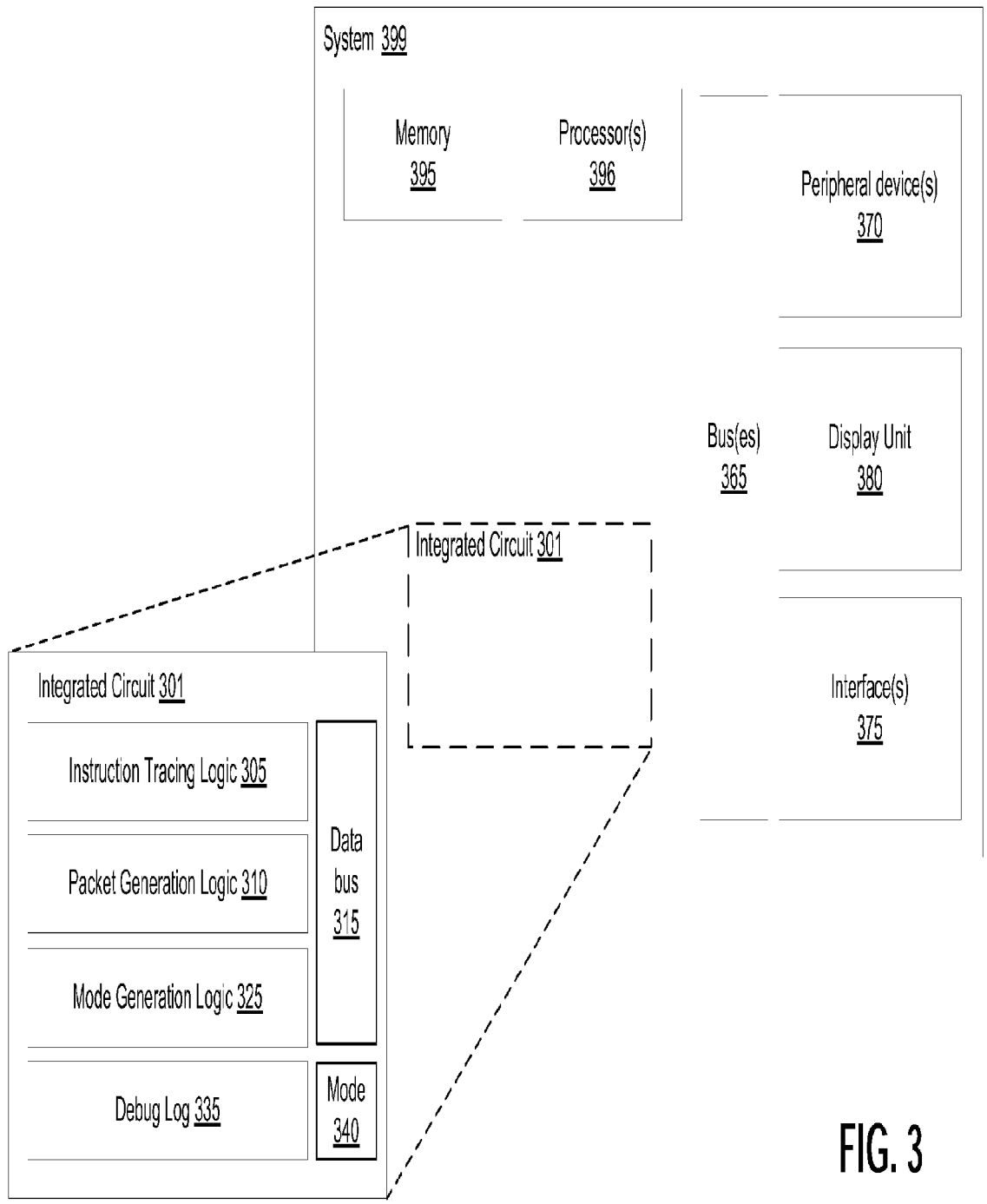
FIG. 3 shows a diagrammatic representation of a system in accordance with which embodiments may operate, be installed, integrated, or configured.

FIG. 3 shows a diagrammatic representation of a system 399 in accordance with which embodiments may operate, be installed, integrated, or configured.

In one embodiment, system 399 includes a memory 395 and a processor or processors 396. For example, memory 395 may store instructions to be executed and processor(s) 396 may execute such instructions. System 399 includes communication bus(es) 365 to transfer transactions, instructions, requests, and data within system 399 among a plurality of peripheral device(s) 370 communicably interfaced with one or more communication buses 365 and/or interface(s) 375. Display unit 380 is additionally depicted within system 399.

Distinct within system 399 is integrated circuit 301 which may be installed and configured in a compatible system 399, or manufactured and provided separately so as to operate in conjunction with appropriate components of system 399.

In accordance with one embodiment, system 399 includes at least a display unit 380 and an integrated circuit 301. The integrated circuit 301 may operate as, for example, a processor or as another computing component of system 399. In such an embodiment, the integrated circuit 301 of system 399 includes at least: a data bus 315, instruction tracing logic 305 to trace instructions of a traced application, mode, or code region, as the instructions are executed by the integrated circuit and packet generation logic 310 to generate a plurality of packets to a debug log 335 describing the traced instructions. In such an embodiment, the integrated circuit is to initiate an alternative mode of execution and mode generation logic 325 of the integrated circuit is to suppress indication of entering the alternative mode of execution. In some embodiments, a mode bit 340 may be utilized to determine whether to operate in accordance with an invisible trace mode or a visible trace mode upon transitioning to the alternative mode of execution.

In accordance with one embodiment, such a system 399 embodies a tablet or a smartphone, in which the display unit 380 is a touchscreen interface of the tablet or the smartphone; and further in which the integrated circuit 301 is incorporated into the tablet or smartphone.

FIG. 4 is a flow diagram illustrating a method for implementing optional logging of debug activities in a real time instruction tracing log in accordance with described embodiments. Method 400 may be performed by processing logic that may include hardware (e.g., circuitry, dedicated logic, programmable logic, microcode, etc.). The numbering of the blocks presented is for the sake of clarity and is not intended to prescribe an order of operations in which the various blocks must occur.

Method 400 begins with processing logic for initiating instruction tracing for instructions of a traced application, mode, or code region, as the instructions are executed by the integrated circuit (block 405).

At block 410, processing logic generates a plurality of packets to a debug log describing the instruction tracing.

At block 415, processing logic initiates an alternative mode of execution within the integrated circuit.

Decision point 417 is then reached at which it is determined whether to operate in accordance with a visible trace mode or an invisible trace mode. For example, such a determination may be subject to a mode bit of the integrated circuit.

If invisible, then flow proceeds to block 420 and processing logic suppresses indication of entering the alternative mode of execution.

If visible, then flow proceeds to block 425, and processing logic logs an indication of a transition from the instructions of the traced application, mode, or code region to the alternative mode of execution.

Figure 5A:
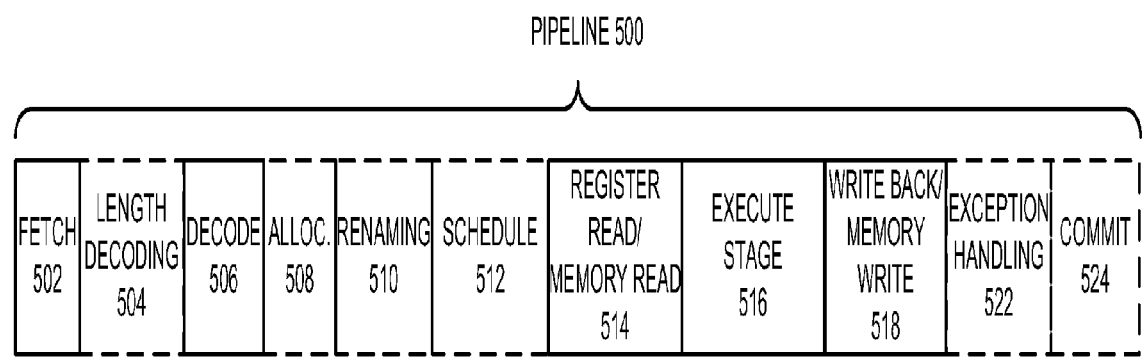
FIG. 5A is a block diagram illustrating both an exemplary in-order pipeline and an exemplary register renaming, out-of-order issue/execution pipeline in accordance with described embodiments.
Figure 5B:
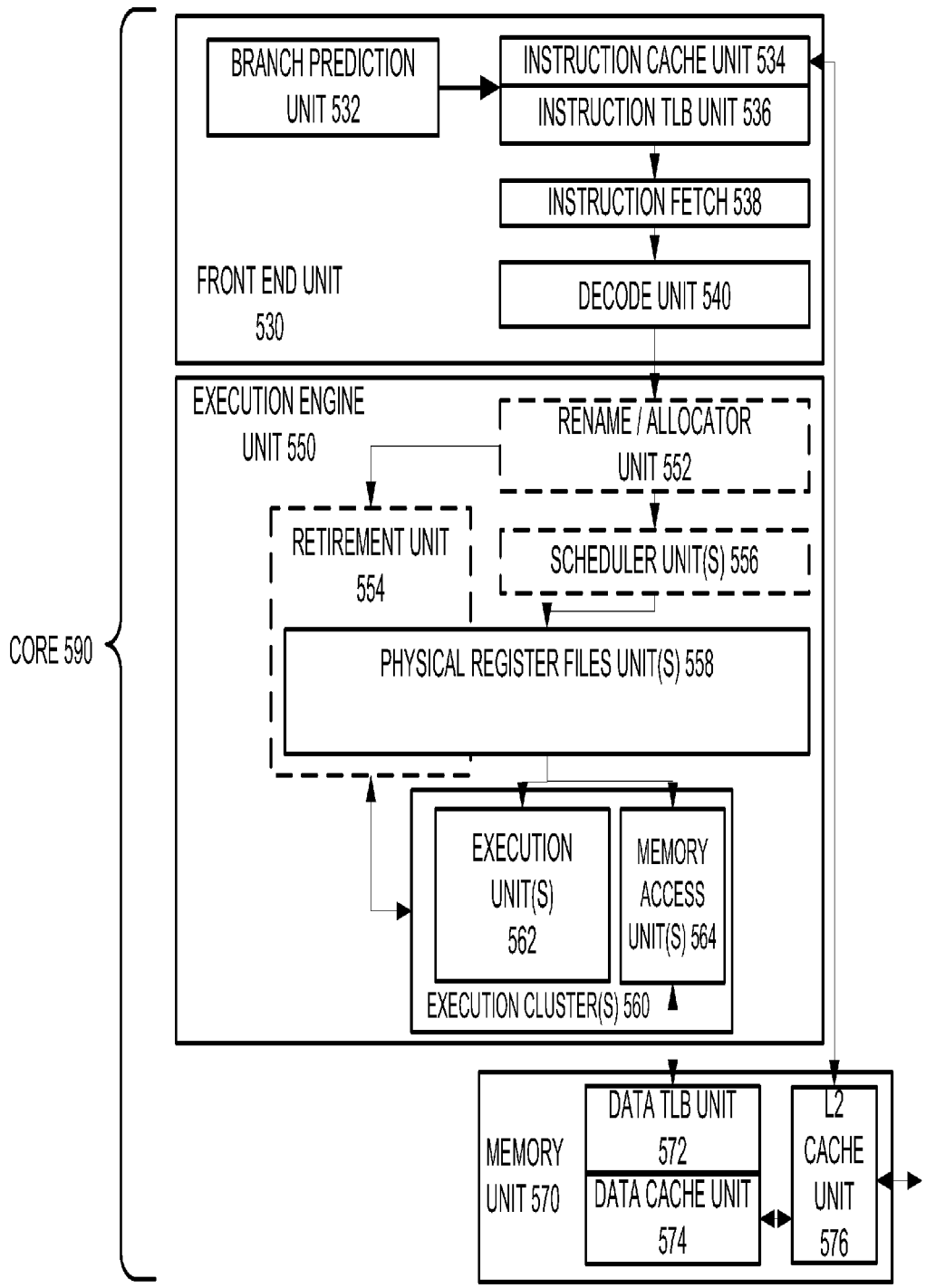
FIG. 5B is a block diagram illustrating both an exemplary embodiment of an in-order architecture core and an exemplary register renaming, out-of-order issue/execution architecture core to be included in a processor in accordance with described embodiments.

FIG. 5A is a block diagram illustrating both an exemplary in-order pipeline and an exemplary register renaming, out-of-order issue/execution pipeline in accordance with described embodiments. FIG. 5B is a block diagram illustrating both an exemplary embodiment of an in-order architecture core and an exemplary register renaming, out-of-order issue/execution architecture core to be included in a processor in accordance with described embodiments. The solid lined boxes in FIG. 5A and FIG. 5B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524.

FIG. 5B shows processor core 590 including a front end unit 530 coupled to an execution engine unit 550, and both are coupled to a memory unit 570. The core 590 may be a reduced instruction set computing (RISC) core, a complex instruction set computing (CISC) core, a very long instruction word (VLIW) core, or a hybrid or alternative core type. As yet another option, the core 590 may be a special-purpose core, such as, for example, a network or communication core, compression engine, coprocessor core, general purpose computing graphics processing unit (GPGPU) core, graphics core, or the like.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 590 includes a microcode ROM or other medium that stores microcode for certain macroinstructions (e.g., in decode unit 540 or otherwise within the front end unit 530). The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations, central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 558 comprises a vector registers unit, a write mask registers unit, and a scalar registers unit. These register units may provide architectural vector registers, vector mask registers, and general purpose registers. The physical register file(s) unit(s) 558 is overlapped by the retirement unit 554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which includes a data TLB unit 572 coupled to a data cache unit 574 coupled to a level 2 (L2) cache unit 576. In one exemplary embodiment, the memory access units 564 may include a load unit, a store address unit, and a store data unit, each of which is coupled to the data TLB unit 572 in the memory unit 570. The instruction cache unit 534 is further coupled to a level 2 (L2) cache unit 576 in the memory unit 570. The L2 cache unit 576 is coupled to one or more other levels of cache and eventually to a main memory.

By way of example, the exemplary register renaming, out-of-order issue/execution core architecture may implement the pipeline 500 as follows: 1) the instruction fetch 538 performs the fetch and length decoding stages 502 and 504; 2) the decode unit 540 performs the decode stage 506; 3) the rename/allocator unit 552 performs the allocation stage 508 and renaming stage 510; 4) the scheduler unit(s) 556 performs the schedule stage 512; 5) the physical register file(s) unit(s) 558 and the memory unit 570 perform the register read/memory read stage 514; the execution cluster 560 perform the execute stage 516; 6) the memory unit 570 and the physical register file(s) unit(s) 558 perform the write back/memory write stage 518; 7) various units may be involved in the exception handling stage 522; and 8) the retirement unit 554 and the physical register file(s) unit(s) 558 perform the commit stage 524.

The core 590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 534/574 and a shared L2 cache unit 576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 6:
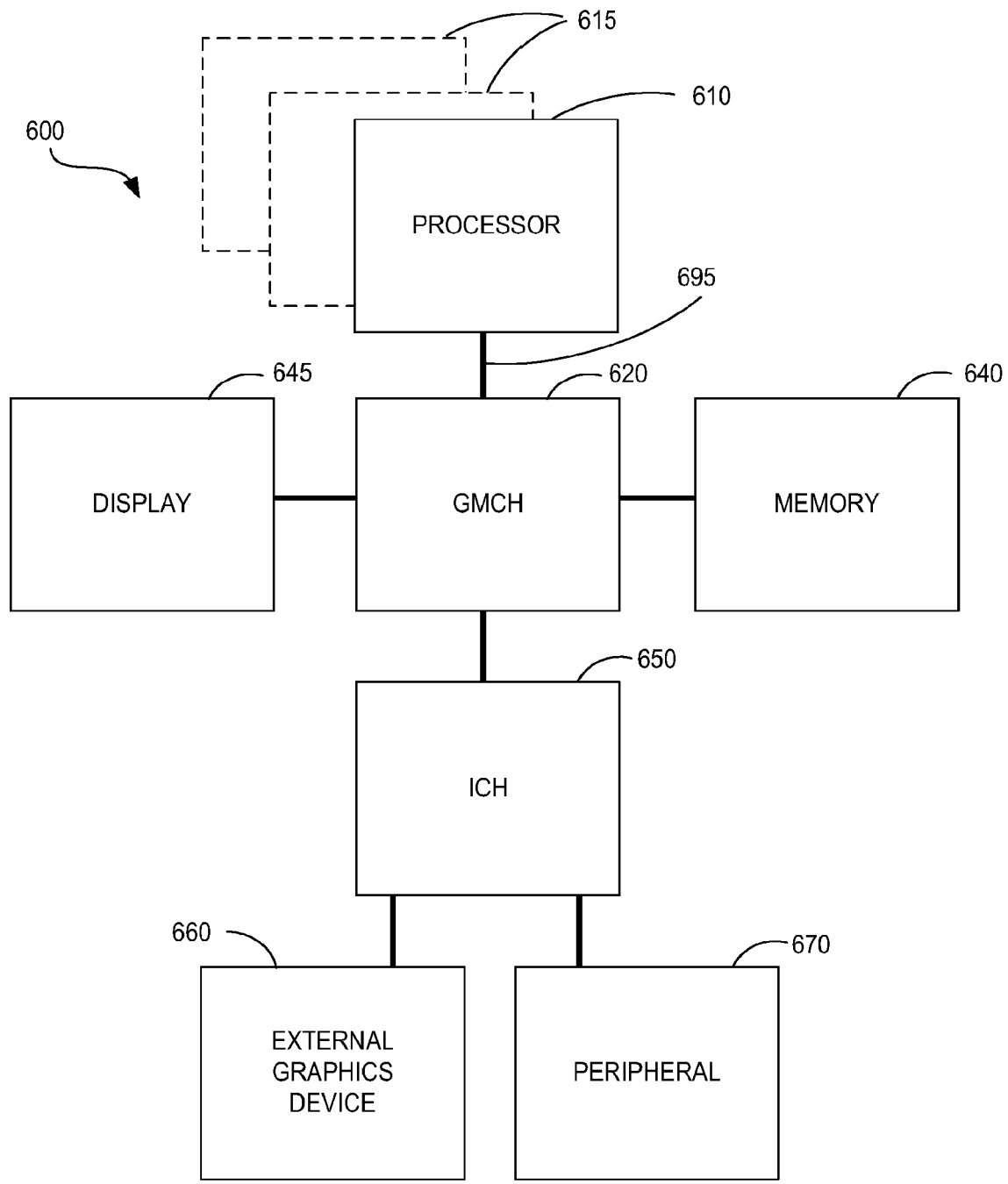
FIG. 6 is a block diagram of a computer system according to one embodiment.

Referring now to FIG. 6, shown is a block diagram of a system 600 in accordance with one embodiment of the present invention. The system 600 may include one or more processors 610, 615, which are coupled to graphics memory controller hub (GMCH) 620. The optional nature of additional processors 615 is denoted in FIG. 6 with broken lines.

Each processor 610, 615 may be some version of the circuit, integrated circuit, processor, and/or silicon integrated circuit as described above. However, it should be noted that it is unlikely that integrated graphics logic and integrated memory control units would exist in the processors 610, 615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel or touchscreen display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the processor(s) 610, 615 in terms of a spectrum of metrics of merit including architectural, micro-architectural, thermal, power consumption characteristics, and the like. These differences may effectively manifest themselves as asymmetry and heterogeneity amongst the processors 610, 615. For at least one embodiment, the various processors 610, 615 may reside in the same die package.

Figure 7:
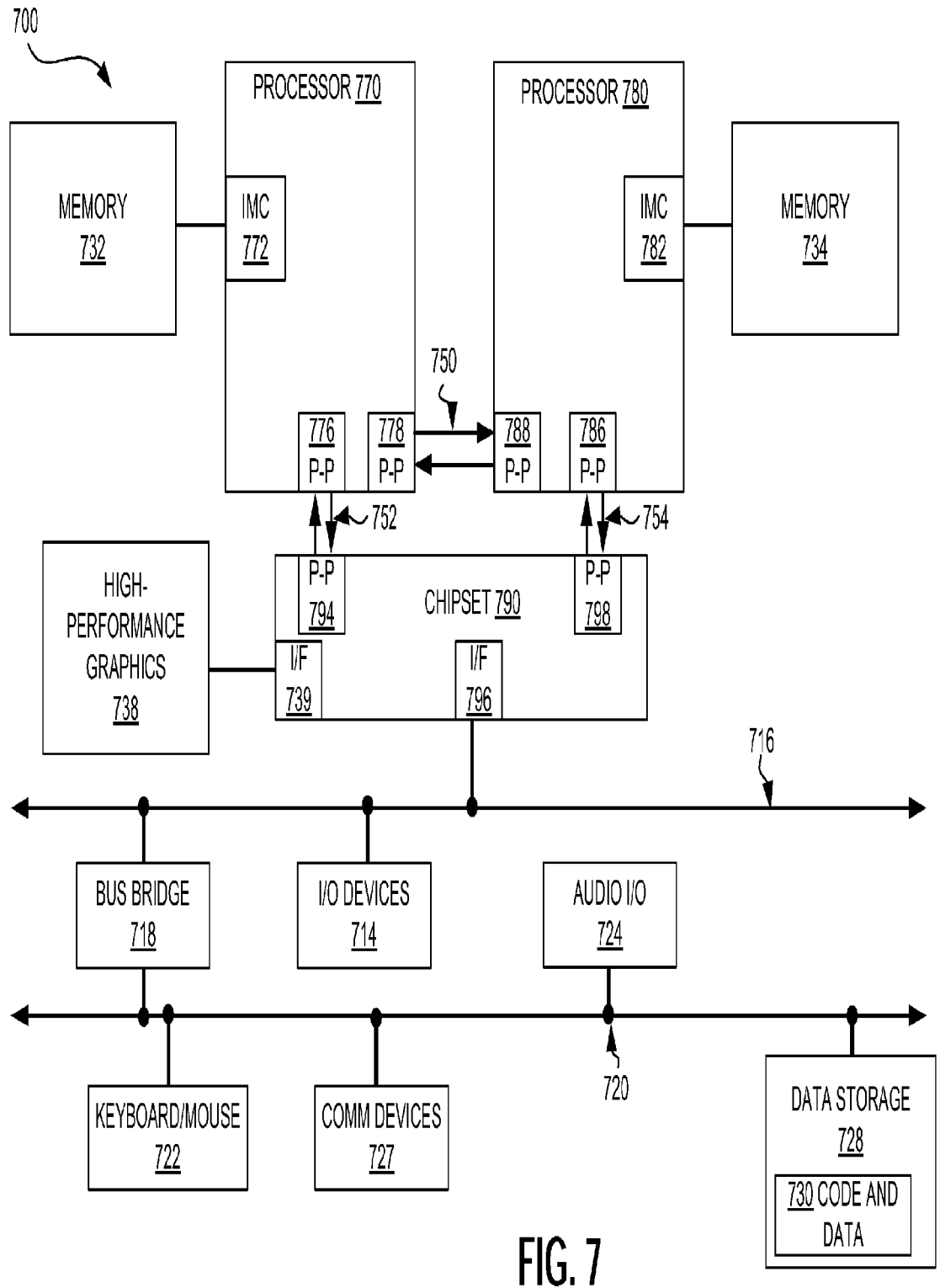
FIG. 7 is a block diagram of a computer system according to one embodiment.

Referring now to FIG. 7, shown is a block diagram of a second system 700 in accordance with an embodiment of the present invention. As shown in FIG. 7, multiprocessor system 700 is a point-to-point interconnect system, and includes a first processor 770 and a second processor 780 coupled via a point-to-point interface 750. Each of processors 770 and 780 may be some version of the processors or integrated circuits as previously described or as one or more of the processors 610, 615.

While shown with only two processors 770, 780, it is to be understood that the scope of the present invention is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
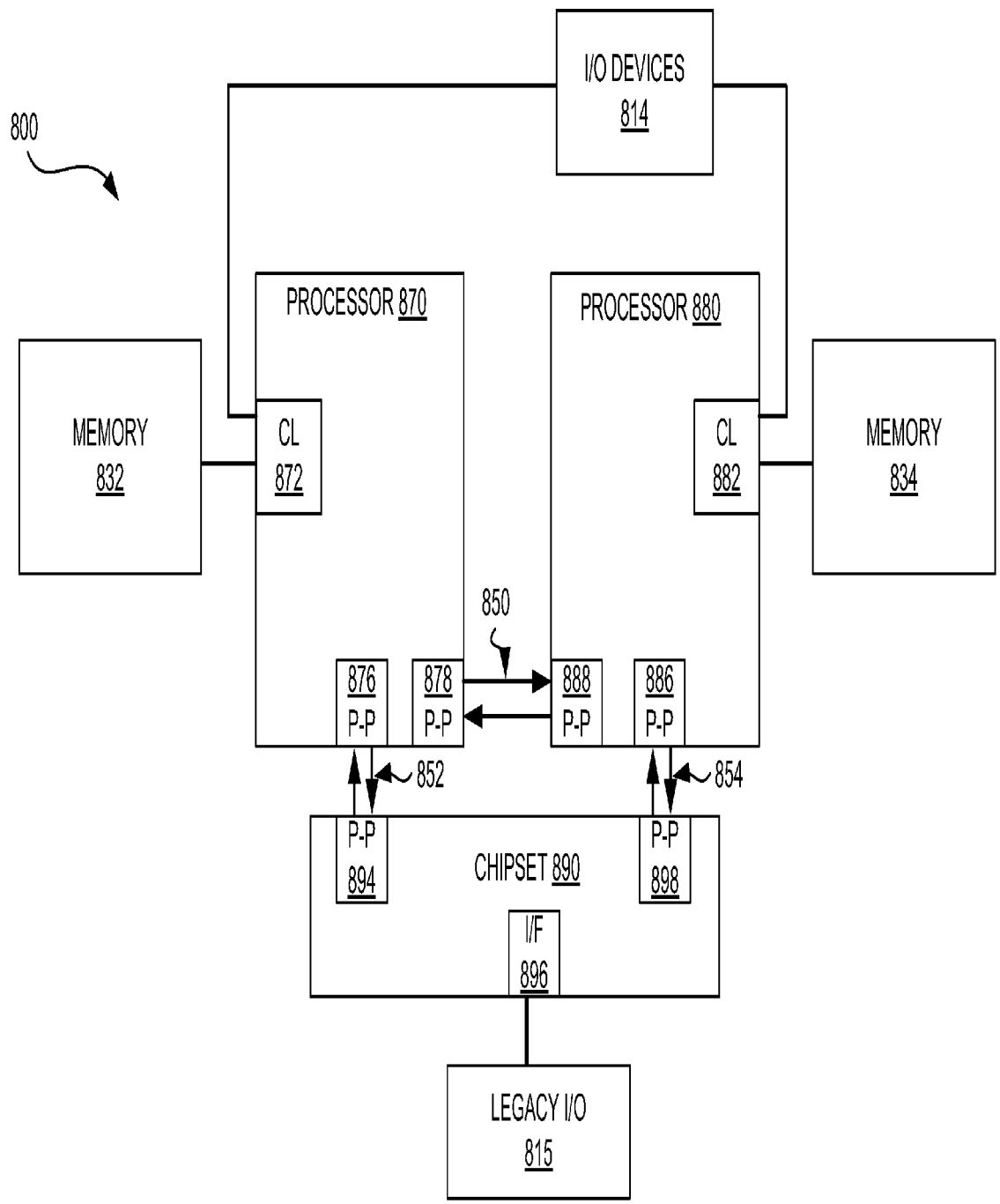
FIG. 8 is a block diagram of a computer system according to one embodiment.

Referring now to FIG. 8, shown is a block diagram of a system 800 in accordance with an embodiment of the present invention. FIG. 8 illustrates that the processors 870, 880 may include integrated memory and I/O control logic ("CL") 872 and 882, respectively and intercommunicate with each other via point-to-point interconnect 850 between point-to-point (P-P) interfaces 878 and 888 respectively. Processors 870, 880 each communicate with chipset 890 via point-to-point interconnects 852 and 854 through the respective P-P interfaces 876 to 894 and 886 to 898 as shown. For at least one embodiment, the CL 872, 882 may include integrated memory controller units. CLs 872, 882 may include I/O control logic. As depicted, memories 832, 834 coupled to CLs 872, 882 and I/O devices 814 are also coupled to the control logic 872, 882. Legacy I/O devices 815 are coupled to the chipset 890 via interface 896.

Figure 9:
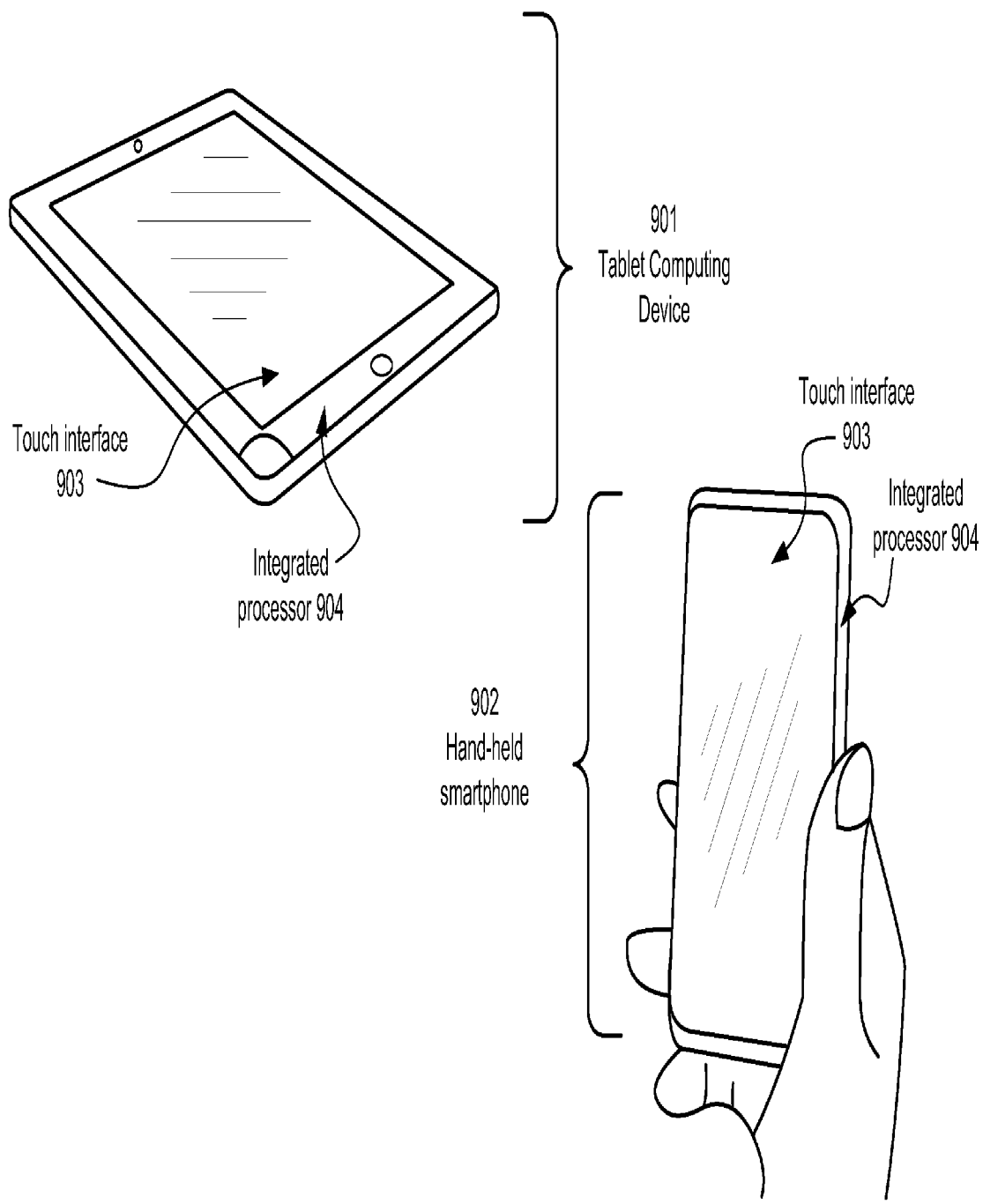
FIG. 9 depicts a tablet computing device and a hand-held smartphone each having a circuitry integrated therein as described in accordance with the embodiments.

FIG. 9 depicts a tablet computing device 901 and a hand-held smartphone 902 each having a circuitry integrated therein as described in accordance with the embodiments. As depicted, each of the tablet computing device 901 and the hand-held smartphone 902 include a touchscreen interface 903 and an integrated processor 904 in accordance with disclosed embodiments.

For example, in one embodiment, a system embodies a tablet computing device 901 or a hand-held smartphone 902, in which a display unit of the system includes a touchscreen interface 903 for the tablet or the smartphone and further in which memory and an integrated circuit operating as an integrated processor are incorporated into the tablet or smartphone, in which the integrated processor implements one or more of the embodiments described herein for implementing optional logging of debug activities in a real time instruction tracing log. In one embodiment, the integrated circuit described above or the depicted integrated processor of the tablet or smartphone is an integrated silicon processor functioning as a central processing unit for a tablet computing device or a smartphone.

For example, in accordance with one embodiment, a tablet computing device includes: a display unit; and an integrated circuit which includes: a data bus, instruction tracing logic to trace instructions of a traced application, mode, or code region, as the instructions are executed by the integrated circuit and packet generation logic to generate a plurality of packets to a debug log describing the traced instructions. In such an embodiment, the integrated circuit is to initiate an alternative mode of execution and mode generation logic of the integrated circuit is to suppress indication of entering the alternative mode of execution.

Figure 10:
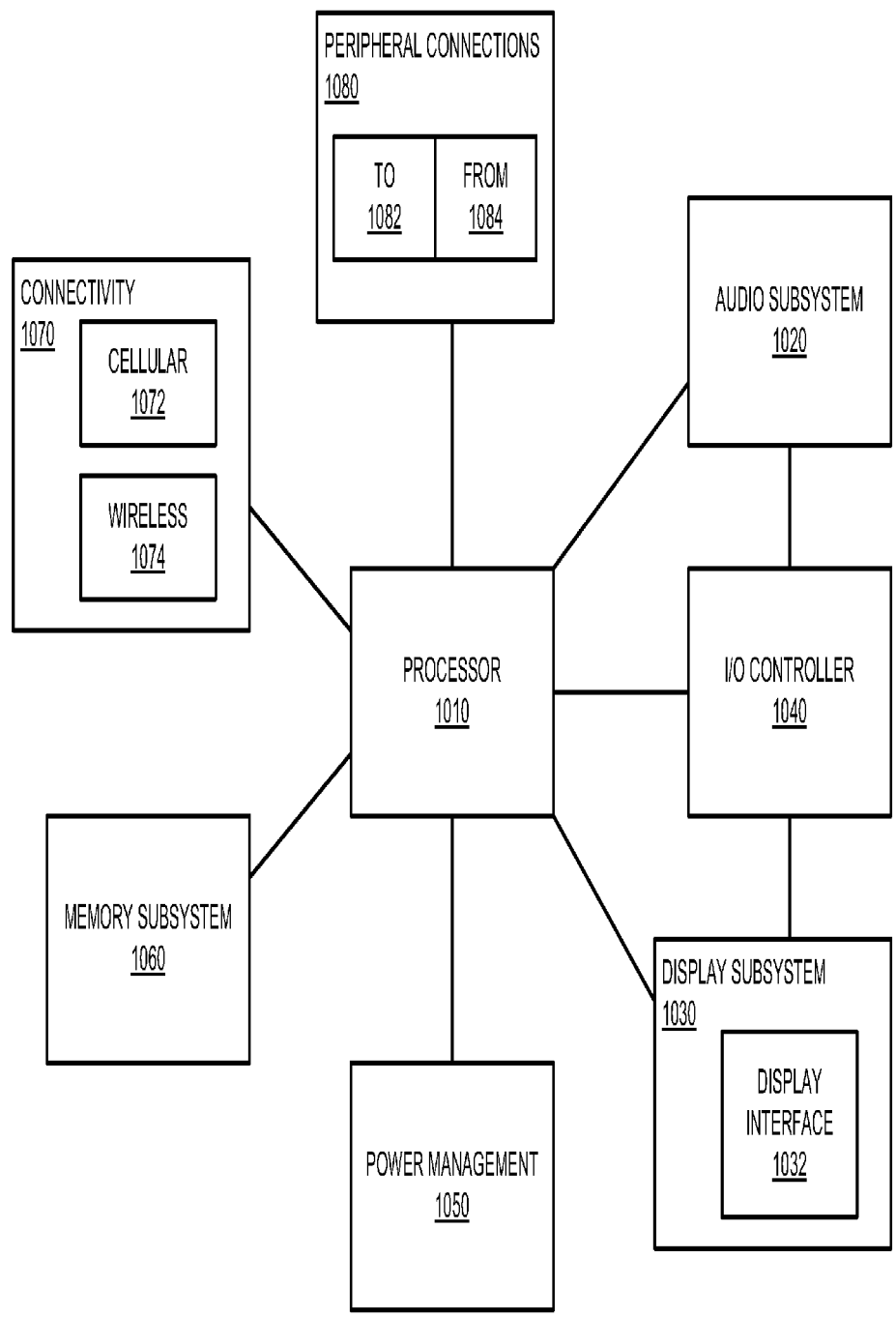
FIG. 10 is a block diagram of an embodiment of tablet computing device, a smartphone, or other mobile device in which touchscreen interface connectors are used.

FIG. 10 is a block diagram 1000 of an embodiment of tablet computing device, a smartphone, or other mobile device in which touchscreen interface connectors are used. Processor 1010 performs the primary processing operations. Audio subsystem 1020 represents hardware (e.g., audio hardware and audio circuits) and software (e.g., drivers, codecs) components associated with providing audio functions to the computing device. In one embodiment, a user interacts with the tablet computing device or smartphone by providing audio commands that are received and processed by processor 1010.

Display subsystem 1030 represents hardware (e.g., display devices) and software (e.g., drivers) components that provide a visual and/or tactile display for a user to interact with the tablet computing device or smartphone. Display subsystem 1030 includes display interface 1032, which includes the particular screen or hardware device used to provide a display to a user. In one embodiment, display subsystem 1030 includes a touchscreen device that provides both output and input to a user.

I/O controller 1040 represents hardware devices and software components related to interaction with a user. I/O controller 1040 can operate to manage hardware that is part of audio subsystem 1020 and/or display subsystem 1030. Additionally, I/O controller 1040 illustrates a connection point for additional devices that connect to the tablet computing device or smartphone through which a user might interact. In one embodiment, I/O controller 1040 manages devices such as accelerometers, cameras, light sensors or other environmental sensors, or other hardware that can be included in the tablet computing device or smartphone. The input can be part of direct user interaction, as well as providing environmental input to the tablet computing device or smartphone.

In one embodiment, the tablet computing device or smartphone includes power management 1050 that manages battery power usage, charging of the battery, and features related to power saving operation. Memory subsystem 1060 includes memory devices for storing information in the tablet computing device or smartphone. Connectivity 1070 includes hardware devices (e.g., wireless and/or wired connectors and communication hardware) and software components (e.g., drivers, protocol stacks) to the tablet computing device or smartphone to communicate with external devices. Cellular connectivity 1072 may include, for example, wireless carriers such as GSM (global system for mobile communications), CDMA (code division multiple access), TDM (time division multiplexing), or other cellular service standards). Wireless connectivity 1074 may include, for example, activity that is not cellular, such as personal area networks (e.g., Bluetooth), local area networks (e.g., WiFi), and/or wide area networks (e.g., WiMax), or other wireless communication.

Peripheral connections 1080 include hardware interfaces and connectors, as well as software components (e.g., drivers, protocol stacks) to make peripheral connections as a peripheral device ("to" 1082) to other computing devices, as well as have peripheral devices ("from" 1084) connected to the tablet computing device or smartphone, including, for example, a "docking" connector to connect with other computing devices. Peripheral connections 1080 include common or standards-based connectors, such as a Universal Serial Bus (USB) connector, DisplayPort including MiniDisplayPort (MDP), High Definition Multimedia Interface (HDMI), Firewire, etc.

Figure 11:
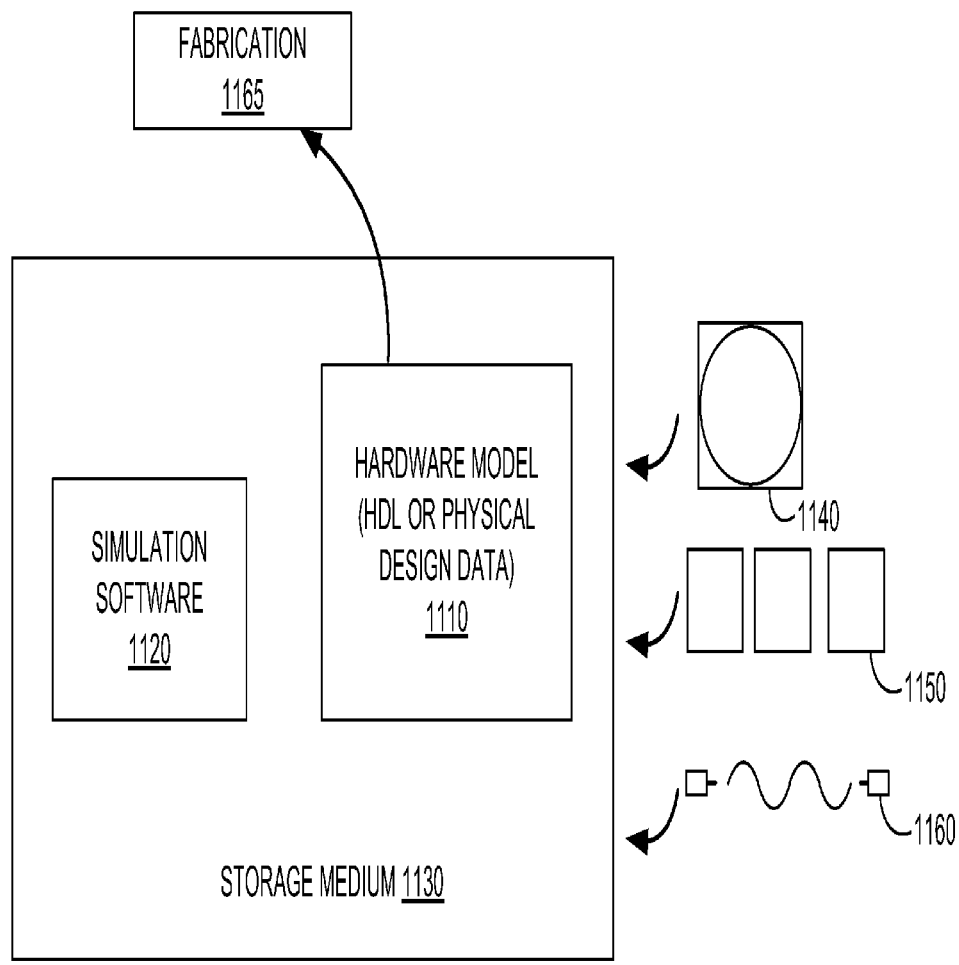
FIG. 11 is a block diagram of an IP core development system according to one embodiment.

FIG. 11 shows a block diagram illustrating the development of IP cores according to one embodiment. Storage medium 1130 includes simulation software 1120 and/or hardware or software model 1110. In one embodiment, the data representing the IP core design can be provided to the storage medium 1130 via memory 1140 (e.g., hard disk), wired connection (e.g., internal) 1150 or wireless connection 1160. The IP core information generated by the simulation tool and model can then be transmitted to a fabrication facility 1165 where it can be fabricated by a 3rd party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
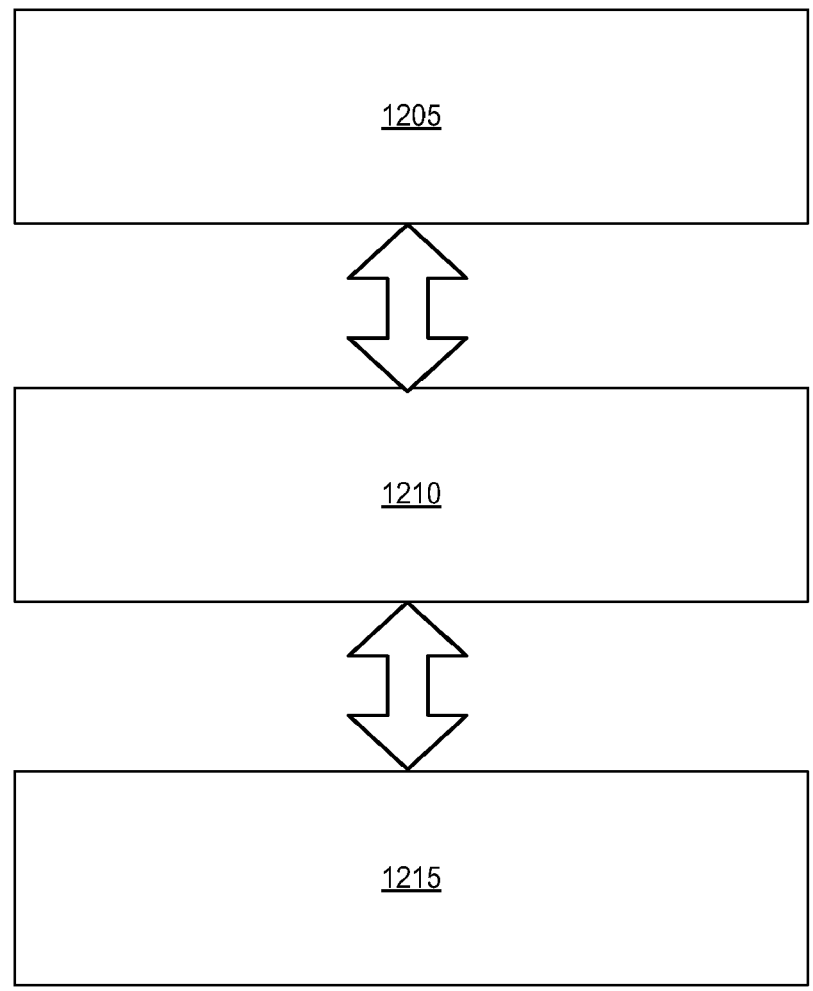
FIG. 12 illustrates an architecture emulation system according to one embodiment.

FIG. 12 illustrates how an instruction of a first type is emulated by a processor of a different type, according to one embodiment. In FIG. 12, program 1205 contains some instructions that may perform the same or substantially the same function as an instruction according to one embodiment. However the instructions of program 1205 may be of a type and/or format that is different or incompatible with processor 1215, meaning the instructions of the type in program 1205 may not be able to execute natively by the processor 1215. However, with the help of emulation logic, 1210, the instructions of program 1205 are translated into instructions that are natively capable of being executed by the processor 1215. In one embodiment, the emulation logic is embodied in hardware. In another embodiment, the emulation logic is embodied in a tangible, machine-readable medium containing software to translate instructions of the type in the program 1205 into the type natively executable by the processor 1215. In other embodiments, emulation logic is a combination of fixed-function or programmable hardware and a program stored on a tangible, machine-readable medium. In one embodiment, the processor contains the emulation logic, whereas in other embodiments, the emulation logic exists outside of the processor and is provided by a third party. In one embodiment, the processor is capable of loading the emulation logic embodied in a tangible, machine-readable medium containing software by executing microcode or firmware contained in or associated with the processor.

Figure 13:
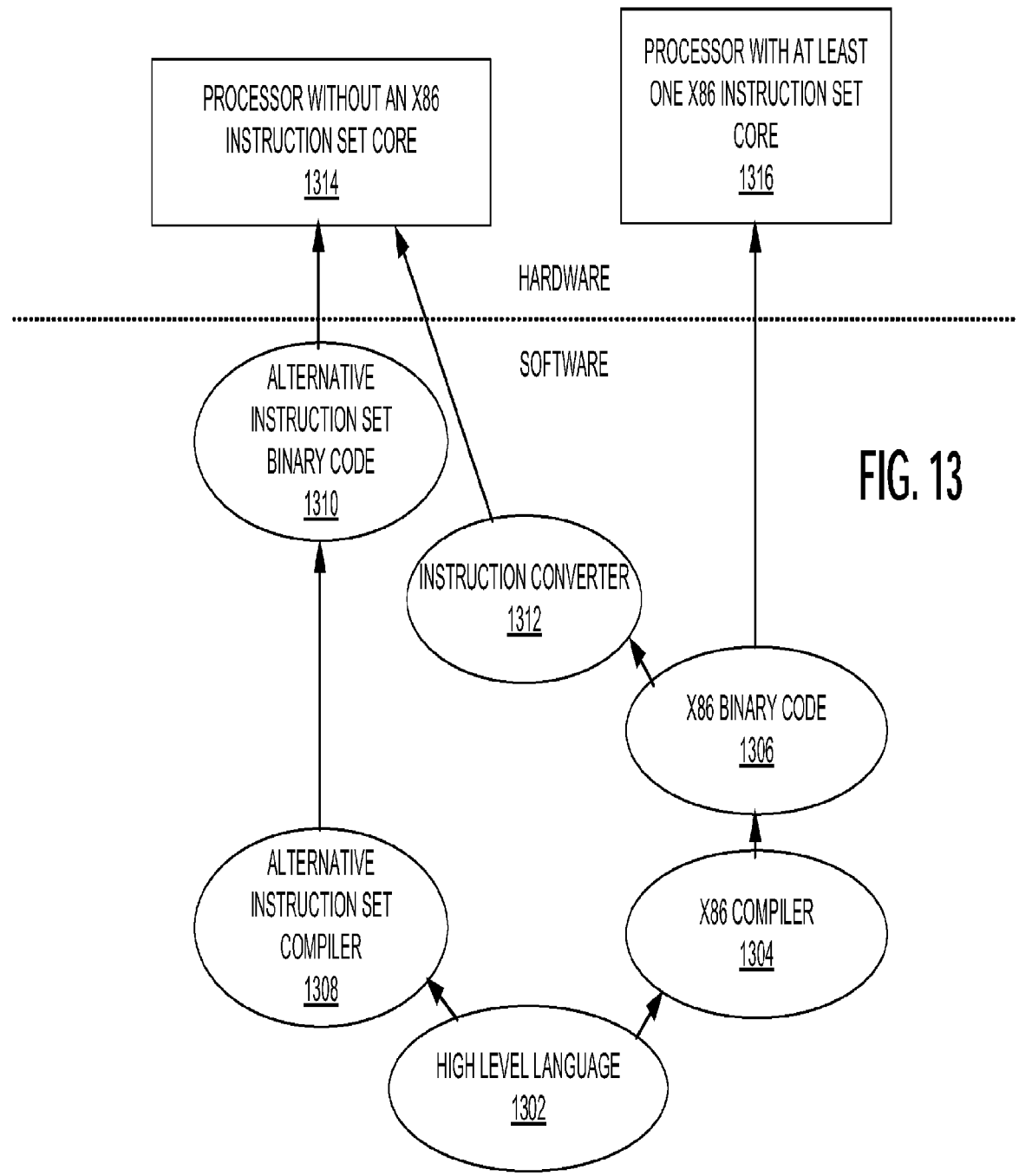
FIG. 13 illustrates a system to translate instructions according to one embodiment.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without at least one x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method comprising:
   initiating instruction tracing for instructions of a traced application, mode, or code region, as the instructions are executed by an integrated circuit;
   generating a plurality of packets to a debug log describing the instruction tracing;
   initiating an alternative mode of execution within the integrated circuit, wherein the alternative mode is a debug mode;
   operating in accordance with an invisible-trace mode or a visible-trace mode based on a setting of a mode bit of the integrated circuit;
   wherein operating in accordance with the invisible-trace mode comprises suppressing an indication of entering the alternative mode of execution;
   wherein operating in accordance with the visible-trace mode comprises logging an indication of a transition from the instructions of the traced application, mode, or code region to the alternative mode of execution.

2. The method of claim 1, wherein suppressing the indication of entering the alternative mode of execution further comprises suppressing packets associated with the instruction tracing during the alternative mode of execution.

3. The method of claim 2, wherein the method further comprises:
   returning from the alternative mode of execution;
   suppressing an indication of returning from the alternative mode of execution; and
   generating additional packets to the debug log describing the instruction tracing for the instructions of the traced application, mode, or code region, as the instructions are executed by the integrated circuit subsequent to returning from the alternative mode of execution.

4. The method of claim 1, wherein generating the plurality of packets to the debug log describing the instruction tracing comprises generating tracing packets associated with the instructions of the traced application, mode, or code region.

5. The method of claim 4, wherein the tracing packets indicate execution events associated with the instructions executed by the integrated circuit of the traced application, mode, or code region.

6. The method of claim 4, wherein the tracing packets indicate execution events, and wherein suppressing the indication of entering the alternative mode of execution comprises suppressing tracing packets indicating an execution event to an alternative application, mode, or code region not subject to the instruction tracing.

7. The method of claim 6, wherein the execution event is selected from the group comprising:
an instruction branch;
an interrupt;
an exception;
a doorbell; and
a trap.

8. The method of claim 1, wherein suppressing the indication of entering the alternative mode of execution comprises suppressing a Packet Generation Disable (PGD) packet indicating a transition either from the instructions of the traced application, mode, or code region or to an alternative mode of execution.

9. The method of claim 8, further comprising:
suppressing a Packet Generation Enable (PGE) packet indicating a transition either from the alternative mode of execution or to the instructions of the traced application, mode, or code region.

10. The method of claim 1, wherein generating the plurality of packets to the debug log describing the instruction tracing comprises generating packets having timing information associated with the instructions of the traced application, mode, or code region.

11. The method of claim 10, wherein the packets having timing information indicate counter and/or clock information associated with the instructions executed by the integrated circuit of the traced application, mode, or code region.

12. The method of claim 10, wherein suppressing indication of entering the alternative mode of execution comprises:
incrementing time-based counters during the alternative mode of execution; and
wherein the time-based counters generate the packets having the timing information.

13. The method of claim 12, wherein:
the time-based counters generate packets having the timing information therein during the alternative mode of execution with execution time during the alternative mode of execution being attributed to either no instruction or attributed to an instruction subject to the instruction tracing prior to initiating the alternative mode of execution.

14. The method of claim 1, wherein generating the plurality of packets to a debug log describing the instruction tracing comprises:
generating tracing packets;
generating timing packets; and
generating maintenance packets in support of the instruction tracing.

15. The method of claim 1, wherein the integrated circuit comprises a Central Processing Unit (CPU).

16. The method of claim 1, wherein the integrated circuit comprises a central processing unit for one of a tablet computing device or a smartphone.

17. The method of claim 1, wherein initiating instruction tracing comprises initiating Real Time Instruction Tracing (RTIT) for the instructions of the traced application, mode, or code region, as the instructions are executed by the integrated circuit.

18. A method performed in an integrated circuit, wherein the method comprises:
initiating instruction tracing for instructions of a traced application, mode, or code region, as the instructions are executed by the integrated circuit;
generating a plurality of packets to a debug log describing the instruction tracing;
initiating an alternative mode of execution within the integrated circuit;
operating in accordance with an invisible-trace mode or a visible trace mode based on a mode bit of the integrated circuit;
wherein operating in accordance with the invisible-trace mode comprises suppressing indication of entering the alternative mode of execution; and
wherein operating in accordance with the visible-trace mode comprises logging an indication of a transition from the instructions of the traced application, mode, or code region to the alternative mode of execution.

19. The method of claim 18, wherein operating in accordance with the visible-trace mode further comprises:
generating packets indicating either a transition from the instructions of the traced application, mode, or code region or a transition to the alternative mode of execution; and
logging the packets indicating the transition.

20. The method of claim 18, wherein operating in accordance with the visible-trace mode further comprises:
suspending counters and/or clocks associated with the instructions of the traced application, mode, or code region during the alternative mode of execution.

21. The method of claim 18, wherein operating in accordance with the visible-trace mode further comprises:
generating, via time-based counters, packets having timing information therein; and
wherein execution time during the alternative mode of execution is attributed to the alternative mode of execution and is distinguishable from execution time for the instructions of the traced application, mode, or code region.

22. The method of claim 18, wherein the alternative mode comprises a debug mode.

23. An integrated circuit comprising:
storage for a mode bit;
instruction tracing logic to trace instructions of a traced application, mode, or code region, as the instructions are executed by the integrated circuit;
packet generation logic to generate a plurality of packets to a debug log describing the traced instructions;
the integrated circuit to initiate an alternative mode of execution; and
mode generation logic to suppress indication of entering the alternative mode of execution, wherein the packet generation logic and the mode generation logic operate in accordance with one of an invisible trace mode or a visible trace mode based on the mode bit.

24. The integrated circuit of claim 23, wherein the integrated circuit comprises a Central Processing Unit (CPU).

25. The integrated circuit of claim 23, wherein the integrated circuit comprises a central processing unit for one of a tablet computing device or a smartphone.

26. A system comprising:
a display unit; and
an integrated circuit, wherein the integrated circuit comprises:
a data bus,
storage for a mode bit;
instruction tracing logic to trace instructions of a traced application, mode, or code region, as the instructions are executed by the integrated circuit,
packet generation logic to generate a plurality of packets to a debug log describing the traced instructions, the integrated circuit to initiate an alternative mode of execution, and mode generation logic to suppress indication of entering the alternative mode of execution, wherein the packet generation logic and the mode generation logic operate in accordance with one of an invisible trace mode or a visible trace mode based on the mode bit.

27. The system of claim 26:

wherein the system embodies a tablet or a smartphone;

wherein the display unit comprises a touchscreen interface of the tablet or the smartphone; and wherein the integrated circuit is incorporated into the tablet or smartphone.

28. A tablet computing device comprising:

a display unit; and an integrated circuit, wherein the integrated circuit comprises:

a data bus, storage for a mode bit;

instruction tracing logic to trace instructions of a traced application, mode, or code region, as the instructions are executed by the integrated circuit, packet generation logic to generate a plurality of packets to a debug log describing the traced instructions, the integrated circuit to initiate an alternative mode of execution, and mode generation logic to suppress indication of entering the alternative mode of execution, wherein the packet generation logic and the mode generation logic operate in accordance with one of an invisible trace mode or a visible trace mode based on the mode bit.

* * * * *